United States Patent [19]
McDermott et al.

[11] 3,722,226
[45] Mar. 27, 1973

[54] PROCESS GAS FORECOOLING SYSTEM

[75] Inventors: Richard L. McDermott, Somerset; Scott A. Mueller, North Plainfield, both of N.J.

[73] Assignee: Airco, Inc., New York, N.Y.

[22] Filed: Mar. 25, 1970

[21] Appl. No.: 22,482

[52] U.S. Cl. ............................62/13, 62/18, 62/20, 62/40
[51] Int. Cl. ............................F25j 3/00, F25j 3/03
[58] Field of Search............62/13, 14, 15, 17, 20, 40, 62/58, 93, 150, 271, 304

[56] References Cited

UNITED STATES PATENTS

| | | | |
|---|---|---|---|
| 1,472,294 | 10/1923 | Curme | 62/40 |
| 2,141,997 | 12/1938 | Linde | 62/13 |
| 2,560,469 | 7/1951 | Ogorzaly | 62/14 |
| 2,643,527 | 6/1953 | Keith | 62/13 |

Primary Examiner—Norman Yudkoff
Assistant Examiner—Arthur F. Purcell
Attorney—Edmund W. Bopp and H. Hume Mathews

[57] ABSTRACT

Forecooling system for a pressurized stream of warm, water-saturated process gas comprising a cooling tower wherein the gas stream is water-cooled and then directed to dryers and processing means, a first heat exchanger for cooling the tower water by a fluorocarbon refrigerant, a compressor and receiving tank for supplying the refrigerant, a second heat exchanger for cooling the exhaust refrigerant from the first exchanger by end-process product gas, and an expansion valve in a refrigerant return line between the second exchanger and receiving tank: an alternate method for directly cooling the process gas stream in the first heat exchanger.

7 Claims, 2 Drawing Figures

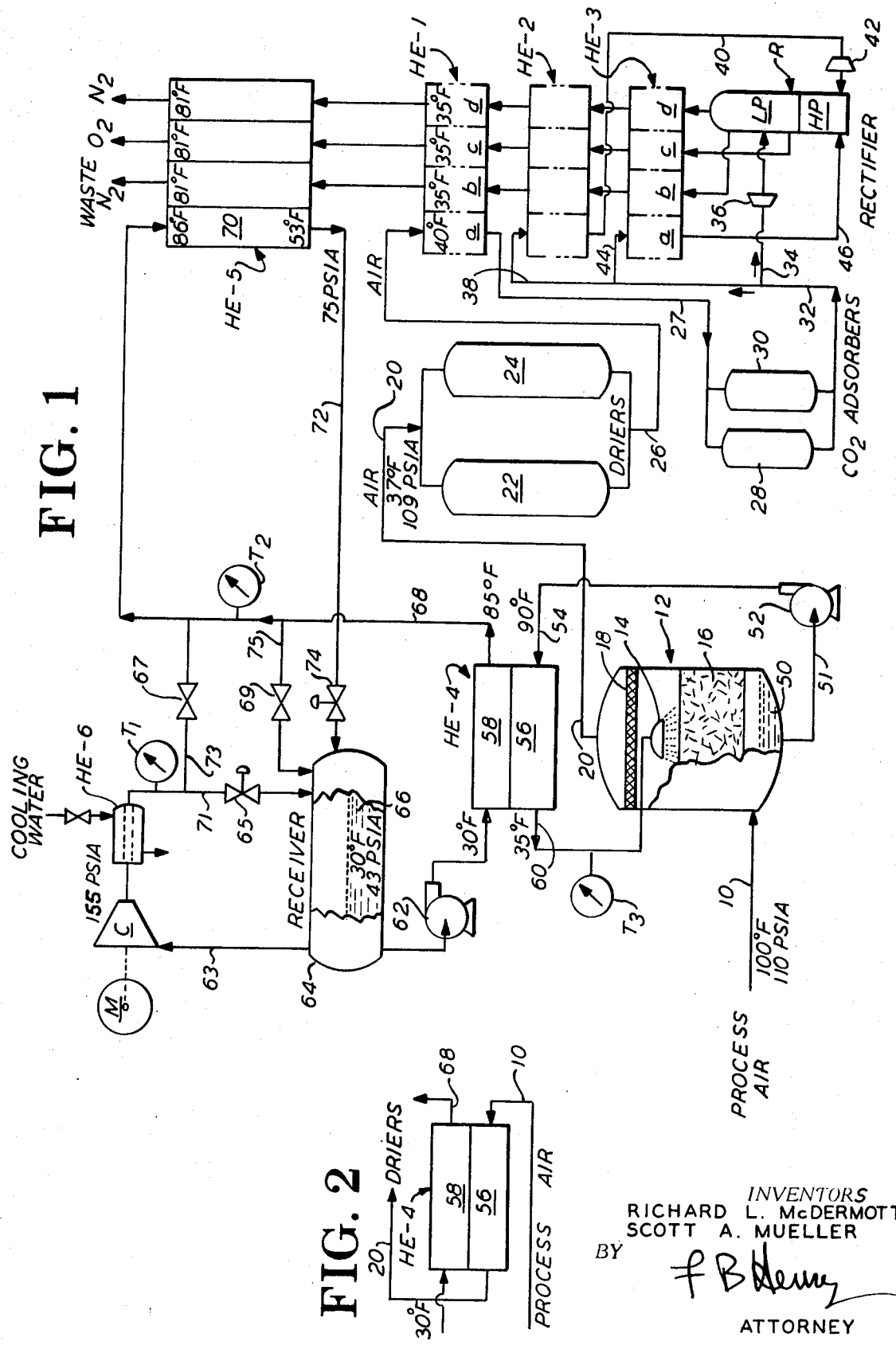

PROCESS GAS FORECOOLING SYSTEM

BACKGROUND OF THE INVENTION

In gas processing systems such as non-reversing air separation systems, the process feed air, previously compressed to about 110 psia and cooled to about 100°F, is normally saturated with water and must be dried to a very low dew point in order to avoid undesired ice formation in the main heat exchangers for the air separation process. In conventional practice, the size of the desiccant beds (dryers) required for drying the wet air stream is materially reduced by forecooling the compressed air to about 40°F. Such cooling results in condensation of the bulk of the water, so that the moisture content of the process air stream is greatly reduced when it reaches the dryers. Heretofore, forecooling has been practiced by various heat exchange arrangements, involving refrigeration units and cold end-process gas. Where a refrigeration compressor unit is used for cooling the process air stream from 100°F down to 40°F for example, the equipment cost and power required are material; also, where the cooling is by cold in-process product gas, considerable system refrigeration otherwise useful, may be lost.

Where the gas processing system is of the reversing type, the heat exchangers have a joint drying - cooling function which requires comparatively large amounts of purging gas upon reversal for removing moisture, etc. from the drying passes of the exchanger. This is practical in air separation plants where for example, large amounts of waste nitrogen are available, oxygen being primarily the plant product. However, where most of the principal constituents are required as plant products, reversing exchangers are no longer practical. A non-reversing system, mentioned above, requiring comparatively small amounts of purging gas is preferred in such cases.

The present invention is concerned with such a system having an economical forecooling system wherein recovery of sensible heat of the process product gases up to near ambient temperature is achieved for minimizing forecooling power requirements.

SUMMARY OF THE INVENTION

In accordance with a preferred form of the invention, pressurized, water-saturated, by process air is passed through a direct-contact or spray type cooling tower wherein the cooling water is introduced at about 35°F; the air stream now cooled and having greatly reduced moisture content is then directed to conventional dryers such as used in a non-reversing air separation plant, for example. The warmed cooling water in turn, is pumped in a closed cycle from the cooling tower through a first heat exchanger in counterflow with a fluorocarbon type refrigerant from an auxiliary system for re-chilling and return to the cooling tower. A compressor unit maintains cold refrigerant under pressure in a receiving or collecting tank and refrigerant therefrom is circulated through the first heat exchanger where it is warmed by the circulating tower water. The refrigerant then is passed through a second heat exchanger and cooled in counterflow with end-process product gases having sub-ambient temperature at system exhaust. Accordingly, remaining sensible heat up to ambient temperature is recovered from the product gases. The circulating refrigerant from the second exchanger is further cooled by expansion as it is returned to the receiving tank. Thus, there is recovered for the forecooling system a considerable amount of refrigeration ordinarily lost at the exhaust or end-process stage. This recovery is quite significant, considering the common practice in non-reversing systems of exhaust venting the end-process product gases at about 35°F or even lower.

In an alternative gas cooling method, the feed gas stream is directly cooled in the first heat exchanger wherein the excess moisture is condensed.

Accordingly, in each method the refrigerator compressor power requirement is minimal as it amounts to but a fraction of the power represented by the sensible heat recovered from the system product gases. Thus, the total forecooling power requirement is mainly met by utilizing the ordinarily lost sensible heat of the end-process product gases in an economical manner for cooling the feed gas stream.

A principal object of the invention therefore is an improved forecooling system for a non-reversing gas processing plant wherein the equipment and power costs expended for forecooling are optimum for economical operation.

A related object is an improved forecooling system of the character described above wherein ordinarily lost sensible heat of process product gases is recovered for mainly cooling a water-saturated, warm stream of process feed gas, so as to condense a major part of the water content of the stream with minimum cost of refrigeration and heat transfer equipment.

Other objects, features and advantages will appear from the following description with reference to the accompanying drawing.

BRIEF DESCRIPTION OF THE DRAWING

FIG. 1 illustrates by way of example, a simplified flow diagram of a non-reversing air separation plant embodying the forecooling system of the invention, and FIG. 2 illustrates a modified arrangement for cooling the process feed air.

DESCRIPTION OF PREFERRED EMBODIMENT

Referring to the drawing, FIG. 1, the incoming or feed line 10 directs the process feed air at about 110 psia, 100°F, into the lower part of a cooling tower 12 that brings descending cooling water into contact with the ascending air stream. The air flows upwardly through the tower in diffused direct-contact counterflow with cooling water from a spray unit or the like, 14. The diffusing means for insuring maximum heat-transfer contact between the counterflow water and gas streams may constitute conventional vertically spaced baffle trays, or suitable diffusing packing, such as generally indicated at 16. Prior to leaving the tower at the upper end thereof, the air stream is passed through a layer of suitable de-misting material at 18 for filtering out suspended particles of moisture. From the cooling tower 12, the air stream, now at about 37°F with low moisture content, is directed by line 20 to conventional parallel connected dryers 22 and 24 where the remaining moisture in the process air is removed. The dryers are of the type ordinarily used in non-reversing air separation plants, i.e., wherein reversing heat exchangers for removing moisture, etc. are not suitable for the production requirements of the plant. Accordingly, the air in the outlet line 26 is conditioned for use in the main heat exchangers of the process system.

As use of the present forecooling system is not limited to a specific arrangement of plant processing equipment, a general description of the non-reversing air separation process given by way of example will suffice for purposes of the invention. The main heat exchanger system is represented by three units, HE–1, HE–2, and HE–3 respectively. Certain heat exchange passages are connected in series for respective streams of cold product gases from the rectifier low pressure section LP as diagrammatically indicated, and the process air is directed through related exchanger passages in counterflow with the product gases. Considering the individual flow paths from exchanger HE–3 through the respective exchanger units as vertically aligned, the flow path $a$ is traversed by the process air (at different process steps) and paths $b$, $c$ and $d$ are serially traversed respectively, by waste nitrogen, oxygen, and nitrogen from the section LP of the rectifier R.

Briefly, the dry process air in line 26 is cooled in passage $a$ of exchanger HE–1, from which it flows through line 27 to the $CO_2$ adsorbers 28 and 30. The outlet stream therefrom in line 32 is divided, one part in line 34 being expanded at 36 into the section LP of the rectifier, another part in line 38 being further cooled in exchanger HE–2 and then directed by line 40 for expansion at 42 into the high pressure section HP of the rectifier and a third portion of the air stream at 44 being further cooled in the exchanger HE–3 and passed through line 46 in liquified form, also to the section HP of the rectifier.

Returning to the forecooling system, the tower cooling water that collects at 50 is drawn off in line 51 for recooling and recirculation. A recirculation pump 52 impels the water through outlet line 54 and into a pass 56 of a heat exchanger HE–4, the pass being in counterflow relation to flow of a cold heat-transfer medium (refrigerant) through the adjacent pass 58 of the exchanger. The refrigerant after passing through exchanger HE–4 is recirculated and recooled in a special manner as described below, and the cooling water which entered the exchanger at about 90°F, is chilled by the refrigerant to about 35°F at the outlet 60, for recirculation feed to the tower spray unit 14.

In the specific example described herein, the heat transfer medium is one form of fluorocarbon refrigerant known to the trade as "Refrigerant 12" or "Freon 12"; other industrial refrigerants operating at desired temperature levels can be used as preferred. The refrigerant is pumped at 62 from a receiving or collecting tank 64 to the exchanger HE–4. The tank is partly filled with liquid refrigerant 66, and maintained at about 43 psia and 30°F. The auxiliary refrigeration system is a conventional closed system apart from the gas stream that includes a motor-driven compressor C that receives by line 63 refrigerant in vapor-phase from the tank 64; the compressor output (at about 155 psia) passes through a water-cooled heat exchanger HE–6 for condensation, and through an expansion valve 65 for return to the receiving tank. The valve 65 is of conventional type, functioning as a combined float-expansion valve for valving pressurized liquid refrigerant to the receiving tank, and is the key adjustment for tank pressure control.

The liquid refrigerant from exchanger HE–4 having been warmed to about 85°F, is directed by line 68 to the pass 70 of heat exchanger HE–5 where it is cooled to about 53°F by counterflow streams of the process product gases as indicated, from the system exchanger HE–1. As the exhaust, or end-process, product gases from the main air separation system, i.e., at the exhaust of exchanger HE–1, are at about 35°F, they contain material amounts of sensible heat with reference to an ambient temperature of approximately 80°F, for example. This temperature differential represents potential refrigeration recovery and is utilized in exchanger HE–5 as described above for cooling the refrigerant. From the exchanger HE–5, the liquid refrigerant at about 75 psia in return line 72 is flashed at the expansion valve 74 into the receiving tank. In this manner, the refrigeration recovered at exchanger HE–5 is added to the refrigerant supply. The refrigerant in the receiving tank is maintained at about 30°F and 43 psia by conventional controls associated with the refrigeration compressor unit described above.

In some instances, it may be desirable to omit the cooling tower of the FIG. 1 system, and direct the feed gas for forecooling initially through the pass 56 of exchanger HE–4, as illustrated by FIG. 2. The moisture that is condensed during cooling is drained from the exchanger in conventional manner. Here, somewhat higher thermal efficiency can be achieved due to elimination of an intermediate heat transfer stage. This can result in increase of the refrigerant temperature up to about 90°F in the HE–5 exchanger input line 68, with corresponding increase in recovery of sensible heat. Accordingly, the improved refrigeration recovery, together with elimination of cooling tower costs, that are achieved with direct cooling as in FIG. 2 must in practice be balanced against well-known advantages of the cooling tower that include improved cleaning of the air by "scrubbing" action, more effective removal of moisture, thereby reducing the load on the driers, and a materially lower pressure drip, as compared with typical commercial heat exchangers.

For maintaining uniform good thermal efficiency during circulation of the refrigerant, a manually controlled transfer valve 67 is connected in a line 73 between the outlet line 71 of the compressor exchanger HE–6 (upstream of expansion valve 65), and the inlet line 68 for the exchanger HE–5. Temperature indicators $T_1$ and $T_2$ are connected to the respective lines generally as shown for indicating relative temperature difference between the respective streams. Where the temperature at $T_1$ is higher than that at $T_2$ (i.e., in general, higher than about 85°F,) indicating higher work output of the compressor, the valve 67 is adjusted for bleeding-off some of the warm liquid refrigerant directly into the exchanger line 68 for maintaining optimum temperature differential and sensible heat recovery at exchanger HE–5. Thus, the improved recovery of sensible heat through the bleed valve 67, compensates for expenditure of excess compressor power as mentioned above.

There is also connected between the warm refrigerant line 68 and the receiving tank, a by-pass return line 75 having a regulating valve 69 that properly proportions the flow through the pass 70 of exchanger HE-5 with reference to that through pass 58 of exchanger HE-4 for temperature control.

Since it is apparent that the inter-related streams of refrigerant and water in exchanger HE-4 will be controlled independently of each other, the pumping circuit for the cooling water has a temperature indicator $T_3$ at the exchanger exhaust. Thus, the water pump 52 can be regulated for ensuring a flow rate through the exchanger that is compatible with adequate cooling of the feed gas stream. Although a system of manual control is indicated for simplicity, it will be apparent that automatic control can be used where desired for integrating the various temperature indicators, valves and motor-operated equipment according to conventional industrial control technique.

The refrigeration recovery at the exchanger HE-5 has been found sufficient for supplying a large part of the forecooling refrigeration; in fact, the required capacity of the refrigeration unit is but 45 to 50 percent of that, were the exchanger HE-5 omitted. A further and important economy is that the exchanger HE-5 can be made quite compact by reason of efficient heat transfer between the liquid refrigerant and product gases. This in turn, lends itself to additional economies as the compact exchanger can be mounted directly on the end-process exchanger HE-1 thereby avoiding additional piping, insulation, etc. and incidental heat loses.

Having set forth the invention in what is considered to be the best embodiment thereof, it will be understood that changes may be made in the system and apparatus as above set forth without departing from the spirit of the invention or exceeding the scope thereof as defined in the following claims.

We claim:

1. In a non-reversing process for separating an incoming stream of pressurized, water-saturated, warm gas into its principal components wherein the gas stream is forecooled, dried, cooled by heat exchange with the end-process gases and rectified to yield said gases, the method which comprises:
   a. providing refrigeration by compressing and condensing and expanding the vapor portion of a confined pressurized source of liquid refrigerant and returning the expanded refrigerant to the confined pressurized source,
   b. circulating from the source a confined stream of cold liquid refrigerant under increased pressure and transferring thereto heat from the incoming gas stream,
   c. separately drying the now cooled gas stream prior to further cooling and rectifying the gas for producing cold end-process gases,
   d. further circulating the now warmed pressurized and confined stream of refrigerant into heat transfer relation with the end-process gases at subambient temperatures for recovery of refrigeration therefrom represented by sensible heat up to about ambient temperature,
   e. and returning the now cooled liquid refrigerant with recovered system refrigeration and expanding it into the source refrigerant for reducing by corresponding amount required refrigeration.

2. The method as specified in claim 1 wherein the source refrigerant is at about 30°F and 43 psia, the pressurized circulating refrigerant is at about 75 psia, and the end-process gases are at about 35°F prior to counterflow heat exchange with the refrigerant.

3. A gas separation system of the non-reversing type having high product yield of the gas components, wherein a stream of incoming pressurized, water-saturated, warm feed gas is forecooled for materially reducing the temperature and moisture content of the gas stream comprising:
   a. a refrigeration system including a closed container for pressurized cold refrigerant in liquid and vapor phases with means for removing vapor phase refrigerant compressing, condensing and expanding the refrigerant vapor and means for returning the expanded refrigerant vapor stream to the closed container,
   b. means providing for flow-confining exterior circulation and further pressurization of liquid refrigerant from the container,
   c. means for transferring heat from the incoming gas stream to the confined circulating refrigerant to forecool the gas stream,
   d. a gas dryer and cooling and rectifying means for reducing the gas stream to end-process component gases at subambient temperatures,
   e. a heat exchanger with respective fluid-confining passes traversed in counterflow by the cold system end-process gases and by the warmed circulating refrigerant for recovery of system refrigeration by the liquid refrigerant,
   f. and fluid expansion means for returning as vapor the confined stream of cooled refrigerant to the container thereby reducing refrigeration requirements.

4. Apparatus as specified in claim 3 wherein the means for transferring heat from the incoming gas stream to the refrigerant is a second multi-pass counterflow-type heat exchanger, one pass of which is traversed by a confined stream of incoming gas and a related pass is traversed by the pressurized circulating refrigerant.

5. Apparatus as specified in claim 3 wherein the refrigerant container is connected to a refrigeration compressor and condenser unit for maintaining cold refrigerant in liquid and vapor phases in the container under pressure, the container outlet is connected to a pump for further pressurizing the refrigerant and circulating it in confined flow into heat transfer relation with the gas stream and to the multi-pass heat exchanger, and the recirculated return refrigerant is flashed into the container by an expansion valve.

6. Apparatus as specified in claim 3 wherein the refrigeration system includes a compressor-condenser unit, and a bleed control valve is connected between the outlet of the unit and the inlet of the refrigerant pass of the heat exchanger for maintaining a preselected operating temperature differential across said pass.

7. Apparatus as specified in claim 3 wherein the incoming gas stream is passed through a cooling tower in diffused counterflow with streams of chilled water for direct forecooling of the gas, and a water pump recirculates the now-warmed tower water through a second multi-pass heat exchanger in separated counterflow with the pressurized circulating refrigerant.

* * * * *